(12) United States Patent
Pope et al.

(10) Patent No.: US 10,691,661 B2
(45) Date of Patent: Jun. 23, 2020

(54) SYSTEM AND METHOD FOR MANAGING THE STORING OF DATA

(71) Applicant: XILINX, INC., San Jose, CA (US)

(72) Inventors: Steven L. Pope, Costa Mesa, CA (US); David J. Riddoch, Cambridgeshire (GB)

(73) Assignee: XILINX, INC., San Jose, CA (US)

( * ) Notice: Subject to any disclaimer, the term of this patent is extended or adjusted under 35 U.S.C. 154(b) by 474 days.

(21) Appl. No.: 14/730,094

(22) Filed: Jun. 3, 2015

(65) Prior Publication Data

US 2016/0357793 A1    Dec. 8, 2016

(51) Int. Cl.
| | |
|---|---|
| G06F 16/22 | (2019.01) |
| H04L 12/26 | (2006.01) |
| G06F 16/2455 | (2019.01) |

(52) U.S. Cl.
CPC .... *G06F 16/2228* (2019.01); *G06F 16/24568* (2019.01); *H04L 43/026* (2013.01); *H04L 43/045* (2013.01)

(58) Field of Classification Search
None
See application file for complete search history.

(56) References Cited

U.S. PATENT DOCUMENTS

| | | |
|---|---|---|
| 6,519,714 B1 | 2/2003 | Sweet et al. |
| 6,836,800 B1 | 12/2004 | Sweet et al. |
| 7,031,884 B1 | 4/2006 | Radulovic et al. |
| 7,093,037 B2 | 8/2006 | Duckman |
| 7,133,808 B2 | 11/2006 | Radulovic et al. |
| 7,181,675 B2 | 2/2007 | Mantog |
| 7,299,277 B1 | 11/2007 | Moran et al. |
| 7,315,542 B2 | 1/2008 | Gil et al. |
| 7,415,390 B2 | 8/2008 | Radulovic et al. |
| 7,587,762 B2 | 9/2009 | Singhal et al. |
| 7,613,714 B2 | 11/2009 | Hiller et al. |
| 7,711,751 B2 | 5/2010 | Kelley et al. |
| 7,764,626 B2 | 7/2010 | Wilken |
| 7,953,876 B1 | 5/2011 | Roman et al. |

(Continued)

FOREIGN PATENT DOCUMENTS

| | | |
|---|---|---|
| EP | 2556632 A1 | 2/2013 |
| EP | 2809033 A1 | 12/2014 |

(Continued)

OTHER PUBLICATIONS

EP 16171767.3—Extended European Search Reoprt dated Oct. 21, 2016, 7 pages.

(Continued)

*Primary Examiner* — James Trujillo
*Assistant Examiner* — John J Morris
(74) *Attorney, Agent, or Firm* — Haynes Beffel & Wolfeld, LLP; Paul A. Durdik

(57) ABSTRACT

A system is arranged to receive data which is written to a data store by a writer. A controller is able to read data from the data store. That controller is able to control the rate at which data is read from the data store with respect to the rate at which data is written to the data store. A query function receives a stream of said data substantially in real time and when said stream of data is unavailable in real time, the query function is able to subsequently obtain that unavailable data from said data store.

15 Claims, 3 Drawing Sheets

(56) References Cited

U.S. PATENT DOCUMENTS

| | | | |
|---|---|---|---|
| 8,125,908 B2 | 2/2012 | Rothstein et al. | |
| 8,180,943 B1 * | 5/2012 | Priem | G06F 9/4812 |
| | | | 710/262 |
| 8,185,651 B2 | 5/2012 | Moran et al. | |
| 8,311,059 B2 | 11/2012 | Williams | |
| 8,447,802 B2 | 5/2013 | Landrum et al. | |
| 8,494,000 B1 | 7/2013 | Nadkarni et al. | |
| 8,572,609 B2 | 10/2013 | Wu | |
| 8,582,454 B2 | 11/2013 | Singhal et al. | |
| 8,626,912 B1 * | 1/2014 | Rothstein | H04L 43/18 |
| | | | 370/235 |
| 8,634,437 B2 | 1/2014 | Wu | |
| 8,635,387 B2 | 1/2014 | Liu et al. | |
| 8,848,744 B1 | 9/2014 | Rothstein et al. | |
| 8,867,343 B2 | 10/2014 | Rothstein et al. | |
| 8,892,733 B2 | 11/2014 | Hirata et al. | |
| 8,898,339 B2 | 11/2014 | Dries et al. | |
| 8,914,726 B2 | 12/2014 | Mollitor et al. | |
| 8,929,378 B2 | 1/2015 | Christophersen | |
| 9,025,486 B1 | 5/2015 | Murphy et al. | |
| 9,065,744 B2 | 6/2015 | Harrison | |
| 2003/0236819 A1 * | 12/2003 | Greubel | H04L 29/06 |
| | | | 709/201 |
| 2004/0133733 A1 | 7/2004 | Bean et al. | |
| 2005/0144165 A1 | 6/2005 | Hafizullah et al. | |
| 2007/0171834 A1 | 7/2007 | Sathyanarayana et al. | |
| 2007/0248029 A1 | 10/2007 | Merkey et al. | |
| 2009/0290848 A1 | 11/2009 | Brown | |
| 2009/0313252 A1 * | 12/2009 | Gupta | H04W 8/18 |
| 2010/0074124 A1 | 3/2010 | Peterman et al. | |
| 2011/0131324 A1 | 6/2011 | Chaturvedi et al. | |
| 2012/0233000 A1 | 9/2012 | Fisher et al. | |
| 2012/0281703 A1 | 11/2012 | Agerholm et al. | |
| 2013/0254324 A1 * | 9/2013 | Kramnik | G06F 12/0246 |
| | | | 709/213 |
| 2013/0311609 A1 | 11/2013 | Kragh et al. | |
| 2013/0329751 A1 | 12/2013 | Zhao et al. | |
| 2014/0040464 A1 | 2/2014 | Singhal et al. | |
| 2014/0280386 A1 | 9/2014 | Mokos et al. | |
| 2014/0355613 A1 | 12/2014 | Pope et al. | |
| 2016/0357796 A1 | 12/2016 | Pope et al. | |

FOREIGN PATENT DOCUMENTS

| | | |
|---|---|---|
| WO | 2005024557 A2 | 3/2005 |
| WO | 2011126603 A1 | 10/2011 |
| WO | 2012163395 A1 | 12/2012 |

OTHER PUBLICATIONS

EP 16171769.9—Partial European Search Report dated Oct. 17, 2016, 7 pages.
U.S. Appl. No. 14/752,472—Office Action dated Sep. 19, 2017, 38 pages.
U.S. Appl. No. 14/752,472—Response to Office Action dated Sep. 19, 2017 filed Dec. 13, 2017, 13 pages.
U.S. Appl. No. 14/752,472—Final Office Action dated Apr. 16, 2018, 38 pages.
U.S. Appl. No. 14/752,472—Response to Final Office Action dated Apr. 16, 2018 filed Jul. 16, 2018, 15 pages.
U.S. Appl. No. 14/752,472—Supplemental Response to Final Office Action dated Apr. 16, 2018 filed Jul. 19, 2018, 6 pages.
U.S. Appl. No. 14/752,472—Office Action dated Nov. 19, 2018, 41 pages.
EP 16171769.9—Extended European Search Reoprt dated Jan. 24, 2017, 5 pages.
EP 16171769.9—Examination Report dated Mar. 8, 2019, 8 pages.
U.S. Appl. No. 14/752,472—Response to Office Action dated Nov. 19, 2018 filed Mar. 13, 2019, 17 pages.
U.S. Appl. No. 14/752,472—Notice of Allowance dated Jul. 8, 2019, 17 pages.

* cited by examiner

SYSTEM AND METHOD FOR MANAGING THE STORING OF DATA

BACKGROUND OF THE INVENTION

Field

Some embodiments relate to a system and method for managing the storing of data in a data network environment.

Background

Data networks may be arranged such that the monitoring and/or capturing of data flows is required. The amount of data which needs to be captured may be relatively large. Queries may also need to be run with respected to the captured data.

SUMMARY

According to one embodiment, there is provided a system comprising: an input configured to receive data; a writer configured to write at least some of said data to said to a data store; a controller configured to read data from said data store, wherein said controller is configured to control the rate at which data is read from data store with respect to writing of data by said writer to said data store; and at least one query function configured to receive a stream of said data substantially in real time and when said stream of data is unavailable in real time to subsequently obtain that unavailable data from said data store.

The controller may be configured to obtain said unavailable data from said data store and write said unavailable data to shared memory, said at least one query function being configured to access said unavailable data from said shared memory. The system may comprise an indexing function, said indexing function configured to provide at least one of said query functions.

The controller may be configured to prioritize writing by said writer to said data store over reading from said data store.

The system may comprise at least one buffer configured to receive data from said input before said data is written to said data store.

The controller may be configured to change a rate at which data is read from said data store in response to a state of said at least one buffer.

The writer may be configured to capture a plurality of data flows and to provide a serialized output.

The writer may be configured to sequentially write said serialized output to said data store The system may comprise an indexer configured to index said data and cause corresponding index information to be stored in said data store. The index information may be written directly to the data store by the indexer or may be passed to the writer for writing to the data store.

At least one query function may be provided in a virtual machine.

The controller may be configured to control scheduling of a plurality of queries from said at least one query function.

A control channel may be provided for at least one query function, said control channel being provided between said query function and said controller, wherein requests for data are provided from said query function to said control block via the control channel Only said controller may be configured to read data from said data store.

The data may comprise a plurality of data flows, each data flow comprising a plurality of packets.

The system may comprise a data store.

According to another aspect, there is provided a method comprising: receiving data; writing at least some of said data to a data store; reading data from said data store; controlling the rate at which data is read from data store with respect to writing of data to said data store; and performing a query on a stream of said data substantially in real time and when said stream of data is unavailable in real time to subsequently obtain that unavailable data from said data store.

The method may comprise obtaining said unavailable data from said data store and writing said unavailable data to shared memory, and accessing said unavailable data from said shared memory for said query.

The method may comprise performing indexing.

The method may comprise prioritizing writing to said data store over reading from said data store.

The method may comprises changing a rate at which data is read from said data store in response to a state of at least one buffer which stores data prior to the writing of said data.

The writing may comprise capturing a plurality of data flows and providing a serialized output.

The method may comprise sequentially writing said serialized output to said data store The method may comprise indexing said data and cause corresponding index information to be stored in said data store.

The method may comprise control scheduling of a plurality of queries from said at least one query function.

The method may comprise providing a control channel wherein requests for data for the query are provided via the control channel The data may comprise a plurality of data flows, each data flow comprising a plurality of packets.

According to another aspect, there is provided a computer program product, comprising a computer readable storage device having a computer readable program code stored therein, said computer readable program code containing instructions configured to be executed by one or more processors a system to cause a method to be implemented, said method comprising: writing received data to a data store; reading data from said data store; controlling the rate at which data is read from data store with respect to writing of data to said data store; and performing a query on a stream of said data substantially in real time and when said stream of data is unavailable in real time to subsequently obtain that unavailable data from said data store.

The computer program product may be able to cause any one or more of the previous method features to be performed.

It should be appreciated that each of the above features may be used in combination with any one or more other features.

BRIEF DESCRIPTION OF DRAWINGS

Some embodiments will now be described by way of example only with reference to the accompanying Figures.

DETAILED DESCRIPTION OF EMBODIMENTS

Figure 1:
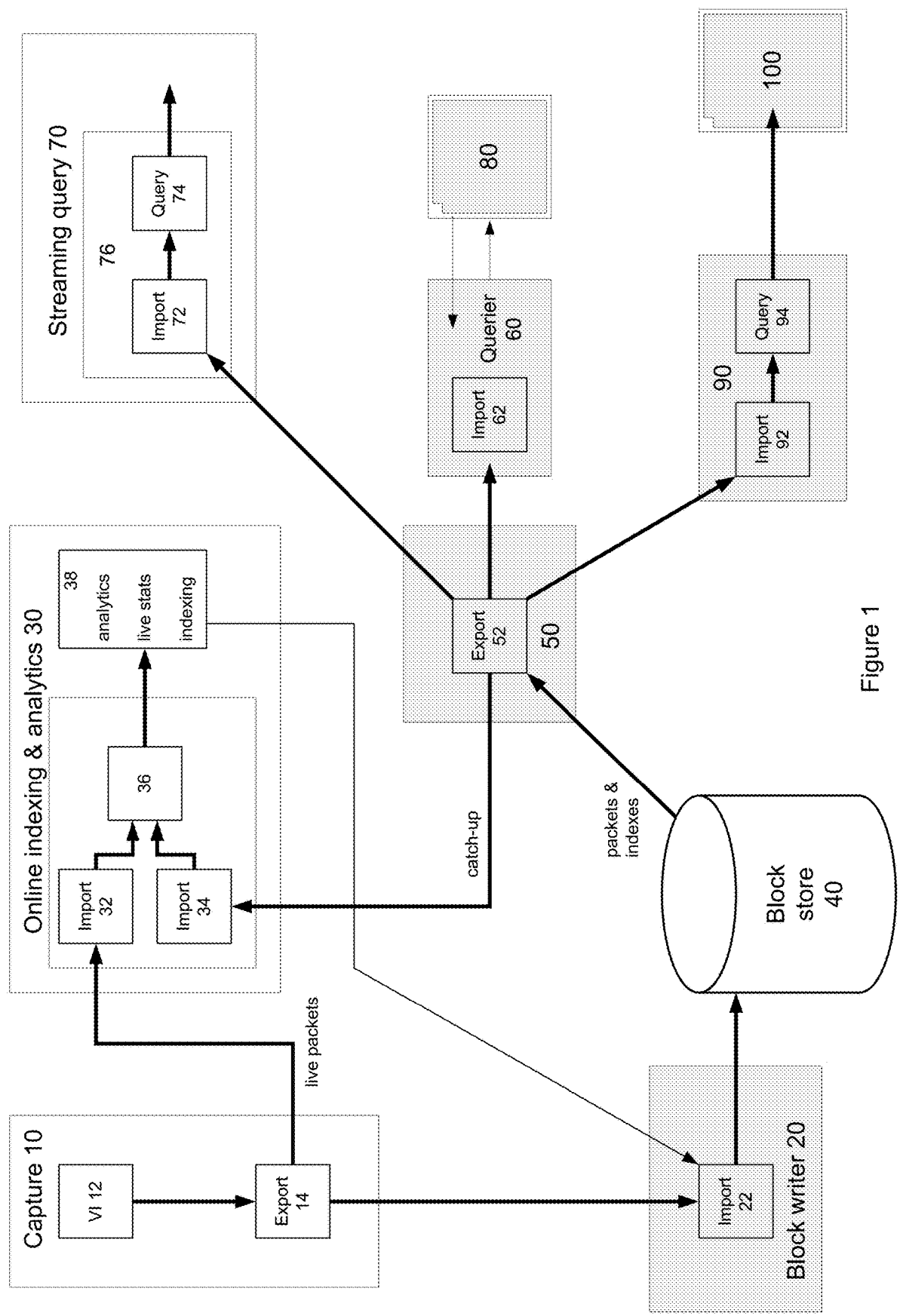
FIG. 1 shows a schematic view of an embodiment.

Some embodiments may be provided in the context of a data network where monitoring and/or capturing of data flows is required.

The monitoring of the data flows may be performed for network performance purposes, to determine a threat, for network management purposes, for statistics and/or for any other suitable reason. In some situations, it may be required that one or more specific flows need to be captured. For example one or more flows identified by a particular set of IP addresses may be required to be captured.

In some situations, it may be desirable to capture all data flows, which are then archived and potentially retrieved at a later date.

Embodiments may be used in any scenario which requires the capture of data. Some embodiments may capture all data whereas other embodiments may only capture some of the data flows.

Some embodiments are configured to index data flows. Indexing will provide indexing information for the data flows. The indexing information may take any suitable form and may for example be metadata.

The data flows may be made up of packets. In some embodiments, different data flows may correspond to different channels. In some embodiments, this indexing of data flows may be in real time. Indexes speed up access to data flows and summary data when querying. Indexes may be stored in any suitable memory and in some embodiments the memory is provided by one or more disks.

The indexing of the data flows may be such that statistics for a GUI (graphical user interface) or the like may be provided. This may be to provide information on top talkers on the network or the like. Indexes provide a quicker way to locate data of interest (e.g. the packets corresponding to a flow) and/or may provide summary information (e.g. number of packets/bytes in a flow). These searches may be done using the underlying data, but generally the indexes make these operations faster.

In some embodiments, every packet which is received may be indexed.

Statistics and other data for a GUI may be obtained in two ways:
  (1) Doing queries (which use index data and/or the underlying packet data); and
  (2) Generate live summary data, for example using the online indexing and analytics function which is discussed in more detail later.

Some embodiments may, for example, provide TCP conversation analysis.

A data flow is captured by a capture block 10. The data flow may comprise data packets. In particular, the capture block 10 has a virtual interface VI 12 or the like which receives the data flow. The data flow from the VI is provided to an export block 14 which passes the live packets to an indexing block 30 which indexes the data flow. This is described in more detail later. In some embodiments, the capture block may be provided by a network interface device or card.

The export block 14 also provides the packets to a block writer 20 and in particular to an import block 22 of the block writer 20. The block writer 20 also receives indexing data from the indexing block 30. The block writer will write the data flow and the indexes to a block store 40. In some embodiments, the indexing data and the associated data are stored on a common disk. In other embodiments, the indexing data and associated data are stored on separate disk devices. In this case, separate block writers or separate block writer instances may be provided for the indexing data and the associated data.

In some embodiments, the block writer is arranges to serialize the captured data to provide a single output thread.

Thus, a single writer thread per block store device may be provided. The block writer ensures that the writes to the block store are sequential. For example the data flow which is received by the block writer may comprise a plurality of threads. The different threads may come from the same capture block or different capture blocks. Embodiments may be such the non-sequential access to the block store is avoided. Sequential access increases the rate at which it is possible to write to disk. This is ensured by multiplexing by the import block of the input streams to provide the single serial output to the block store.

As will be discussed later, some of the data flow may still require indexing if the indexing block is unable to index in real time all the packets of the data flow.

Data flows and the associated indexes (if available) can be read out by a control block 50. The control block 50 has an export block 52 which can export from the control block. The control block is able to provide the data flows and any available indexes to the indexing block 30 and/or to one or more query blocks 70, 60 and 90 as is described in more detail below.

The control block is arranged to read blocks of data from the block store 40 into shared memory (not shown in FIG. 1), and makes those blocks of data available to one or more consumers of the data. Those consumers may be indexers, other analytics, queries or the like.

The control block is configured to monitor buffer utilization in the capture path (that is buffers in the capture block), and if the buffer utilization gets too high, the control block throttles the rate of reading from the block store 40 so that the block writer 20 has enough bandwidth to keep up with the capture rate.

In some embodiments, each consumer has a control channel that it uses to request the blocks that it needs. Data is passed from the control block to the or each consumer using shared memory. The control block has a pool of memory used for data/index blocks and consumers map at least some of this pool into their own address space. When a consumer requests a block, it is read from the block store by the control block into the shared memory, and the control block provides information which indicates to the consumer where the block can be found in the shared memory.

The control block 50 may function as a cache of blocks of data. If a consumer requests a block of data that is already in the memory pool, then it is not necessary to read that block of data from the block store again.

The control block is the only block which is able to read data from the block store. The control block may be configured to prioritize writing to the block store over reading. This is done by throttling the rate at which the control block submits reads to the block store. The capture path exports information about buffer utilisation that the control block imports. If buffer utilisation is getting high, then the block writer is not writing to disk fast enough, so the control block reduces the rate of reads, or stops them altogether.

In some embodiments, the control block is able to schedule different queries. Different ones of the queries may have different priorities and/or completion times. The control block is able to control the scheduling of the queries accordingly. In other embodiments, the control of the scheduling of queries may alternatively or additionally be carried out elsewhere.

Thus in embodiments, when the block writer is writing to the data store, the control block may slow down or stop the reading of data from the block store for the queries. In some embodiments, the control block may prioritise one or more queries over one or more other queries or may slow down each of the queries so that the queries are all continued to be run but at a lower rate.

In some embodiments, a query may be run based on data read out of the block store into shared memory. When the control block throttles the data, the query may fall behind. This may be the case when there is a large quantity of data to be captured. The control block will control the reading out of data from the block store to cause query to catch up. This may be when, for example, the quantity of data to be written to disk is relatively low. Where a query uses a mix of data already stored in the shared memory and data to be written to the shared memory from the block store, the query may use the data already in shared memory while waiting for the data from the block store. In some embodiments, the may need to delivered to the query function in the order by which it was received or the query may be able to process out of ordered data (using for example timestamp metadata).

In some embodiments, more than one query may be running in parallel.

In some embodiments, at least some of the queries may be run in separate containers in order to provide resource isolation. In some embodiments, there may be a plurality of consumer containers. These are described in more detail later and generally provide query functions.

In some embodiments, the received packets from the capture block 10 are output to the indexing block 30. The indexing block 30 may provide online indexing and analytics. In some embodiments, the indexing block may provide real time indexing. In some embodiments, the live packets are captured by import block 32 of the indexing block and processed by process block 36. If the indexing block has indexed a packet in real time, indexing information is sent to the block writer which writes the packet and the indexing information into the block store. The indexing information may provide summary information. If the indexing block is not able to index on a live basis, the catch up packets are read out by the control block from the block store into memory so as to be accessible to the indexing block. The indexing block will provide the indexing information for the catch up packets to the block writer which writes the indexing information into the block store. The process block 36 may allow different data sources (for example the catch up packets and the live packets) to be combined into one stream or to be individually selected, as required.

In some embodiments, a real time query may be carried by the online indexing an analytics block on the received data. In some embodiments, the real time query may fall behind as the block is not able to keep up with the input data. In this situation, the control block is configured to read out the catch up packets from the block store into shared memory The online indexing and analytics block is then able to use the catch up packets to bring the "real time" query back up to date.

In some embodiments, a plurality of different queries can be supported. In some embodiments, more than one query may be supported.

One example is a streaming query which is performed by streaming query block 70. A streaming query is one which is constantly being performed to provide an updated results, for example taking into account a different time period. The streaming query block has an import block 72 which has access to the data in the block store. Access to this data is controlled by the control block.

Generally, for a query (which may or may not be a streaming query), the import block gets data which is read out by the control block into shared memory as described previously. That data is fed into the query processing pipeline, which generates a query result. The query result may consist of one or more of: tabular data; flow records; where to find matched packets; and matched packets themselves.

In some embodiments, tabular data may be presented in the form of a table or graph.

In some embodiments, it is possible to inspect one or more packets using a streaming query.

In the example shown in FIG. 1, a second query block 60 is shown with an import block 62. The second query block may generally operate as described previously. The block may perform a query over the data and generate a result which may be written to a query result file 80. The query result may be as previously described.

A third query component 90 has an import block 92 and a query bock 94. The query and query result may be as described previously. This block may implement a virtual file system which presents the set of packets selected by the query as a file 100 formatted according to the PCAP (packet capture) standard or any other suitable file format. Any suitable application that is capable of reading a PCAP file is able to consume the packets selected by the query.

In some embodiments an API may be provided between the control block and a separate execution domain running a query. The separate execution domain may be provided in a virtual machine with a VI virtual interface to the API.

In some embodiments, data may be passed between components using shared memory or sockets. Shared memory can be used within processes and between processes on the same host/VM. If passing data between components on different hosts/VMs then sockets may be used.

The queries may use graph structures which defines how code should execute the queries. Nodes are used to represent data and edges are lines which connect nodes to nodes. In some embodiments, information about one or more of these nodes and/or edges may be stored and may be reused in different queries.

Results of a query may be written to a cache memory which may be the same or different to the shared memory. In some embodiments the cache memory may be provided by one or more disks. This may be the same or different to the block store. The result of a query may be written to cache such that these results may be used in a subsequent query. For example the result of a query may be written into the cache memory as a set of partial results. For example, there may be a partial (or complete) overlap between a current query and a previous query. For at least part of the overlap, the results of the previous query may be read out of memory and used as part of results of the current query. It should be appreciated that the results of the previous query may be processed further in order to obtain the results of the current query.

In some embodiments, the cached information may be an intermediate result generated as part of query processing. For example, the query processing has a plurality of steps and a final output. The final output may be cached as may the data generated at one or more of the intermediate steps. In other embodiments only the final output may be cached.

Alternatively or additionally only the result of one or more of the intermediate steps may be stored and not the final result.

In some embodiments, a window may be generated with respect to the results of a previous query, to allow a subsequent query to drill down into the results of the previous query. The results of that previous query may be stored in cache memory.

In some embodiments flow records associated with a query may be stored in the cache memory.

In some embodiments, the indexes may be cached as opposed to data blocks.

However in other embodiments, the data blocks may additionally or alternatively by stored in the cache memory.

The query function may receive real time data where possible, but if the data is throttled or cannot keep up, the query function can transition to historical data and back to real time. The query function is aware of the current time and so whether it is behind or not. The system may ensure a seamless transition between live data which is received through shared memory and catchup which comes from the block store.

There may be many simultaneously active queries running on the system, some of which are over indexed flows, others which are over the entire capture.

The function of the indexing block will now be described in more detail. In some embodiments, every incoming frame or packet should match a flow template. Therefore either a matching flow template exists or a new one needs to be created dynamically. In some embodiments, information is provided to locate the persisted frame and is associated with the flow meta-data.

Each packet is parsed and set of header fields extracted. These fields, together with other meta-data are combined to form a flow key. The other meta-data may comprise one or more of timestamp, packet ID, error indication(s) and the like. A flow consists of the set of packets that match a particular flow key. For each unique flow key a flow record is maintained that consists of the flow key, summary data for packets in the corresponding flow and location data for packets in the flow.

The summary data may comprise one or more of the number of packets and bytes in the flow.

The location data may comprise a list of packet indicators, each giving the location of a packet in the block store that is a member of the flow.

The location data may include comprise a list of block indicators, each giving the location of a block in the block store, each block containing at least one packet that is a member of the flow.

The location data may comprise packet indicators giving the location of the first packet in the flow following a temporal boundary.

Various other representations of location data are possible, in other embodiments.

Other methods for indexing may be used in other embodiments, such as compressed bitmap indexes.

Some embodiments may use a disk ring-buffer as the data store for storing in the indexing blocks. When frames in the disk ring-buffer get overwritten, the flow entries are updated to keep the meta-data current and consistent. The table below shows some examples of header/data types and fields in the header/data types.

| Header/Type | Field | Bytes in header | Bytes to be Indexed |
|---|---|---|---|
| Ethernet | Destination MAC | 6 | 6 |
| | Source MAC | 6 | 6 |
| | 802.1Q tag | 2 | 1 |
| | 802.1Q tag | 2 | 2 |
| | Ethertype | 2 | 2 |
| ARP | Stop Here | | |
| IP | IP Protocol | 1 | 1 |
| | Source IP | 4 | 4 |
| | Destination IP | 4 | 4 |
| ICMP/IGMP | Stop Here | | |
| TCP/UDP | Source Port | 2 | 2 |
| | Destination Port | 2 | 2 |

In some embodiments, a flow is defined as all frames or packets sharing common values for one or more header fields with all other fields wild-carded. In some embodiments the flow records contain the unique combinations of values seen in the fields in the above table.

Linked to each flow record may be a list of absolute offsets into the persistent storage of each frame or packet in the flow (8-bytes per offset). Also linked to each flow record may be a list of absolute offsets representing the first frame or packet (if any) on or immediately following a 1 second (or any other suitable value) temporal boundary.

Due to the need to identify (or create) a flow entry for every incoming frame or packet, the performance of this lookup may have a direct impact on the rate at which frames or packets are indexed. Taking the case of 64-byte frames with an 8-byte IFG (inter frame gap), a new frame will arrive at 10 Gbps every 64 ns. At 40 Gbps, that shrinks by a factor of four to a new frame arriving every 16 ns.

Each record in the table may hold all the flow values (for example 31 bytes with room for further fields such as capture point ID, capture port ID etc.) as well as pointers or indexes to reference the associated flow table(s) (for example 8 bytes×2) so assigning a cache-line per entry may provide the necessary capacity. By way of example, to handle a maximum of 65,536 flows, a table of 131,072 entries (50% load) may be required making it ≈8.4 MB.

Some embodiments may aim to reduce indexing load during capture. In some embodiments disk latencies may mask increased query processing latencies.

In some embodiments, the index meta-data may be bounded at ~10% of packet storage. However, this is by way of example only and different ratios between the index meta-data and the packet storage may alternatively be used.

Packets within a flow may be linked together. In some embodiments, the position of the packets in the storage device may be stored as part of that flow record, to aid rapid flow retrieval. These may be the absolute offsets into the persistent storage device. One advantage of using absolute offsets may be that this allows flow offsets to be aged as newer ones overwrite old captured records. Any suitable size of index may be used. By way of example only, a 64-bit index into the persistent storage device may be used. However, different index sizes may be used in different embodiments.

It should be appreciated that in some embodiments, one or more packets may be part of two or more flows. In that scenario, a packet may have one index or more than one index. An index may be provided for each flow which the packet is part of.

Queries may be run over a defined time-range at second resolution. It may be desirable to maintain more than one index, for example a secondary index may be provided which provides rapid retrieval of the blocks associated with the primary index. A secondary index might be in the form of a compressed bitmap index. This may provide rapid retrieval.

It may be desirable to keep detailed per-flow statistics for display via a web interface. These statistics may be presented as a per-flow summary (total frames, total bytes) or possibly broken down graphically by day/hour/minute/second. The following per-flow data may be collected/collated every second. This may be carried out by the indexing block. It should be appreciated that in other embodiments, one or more of these variable may not be collected/collated and/or one or more other variables may be collected/collated.

| Variable | Size (bytes) |
| --- | --- |
| Major Time | 4 |
| Index of first packet after second boundary in block store (bytes) | 8 |
| Index of first frame after second boundary in block store (bytes) | 8 |
| Packets | 4 |
| Bytes | 4 |

Figure 2:
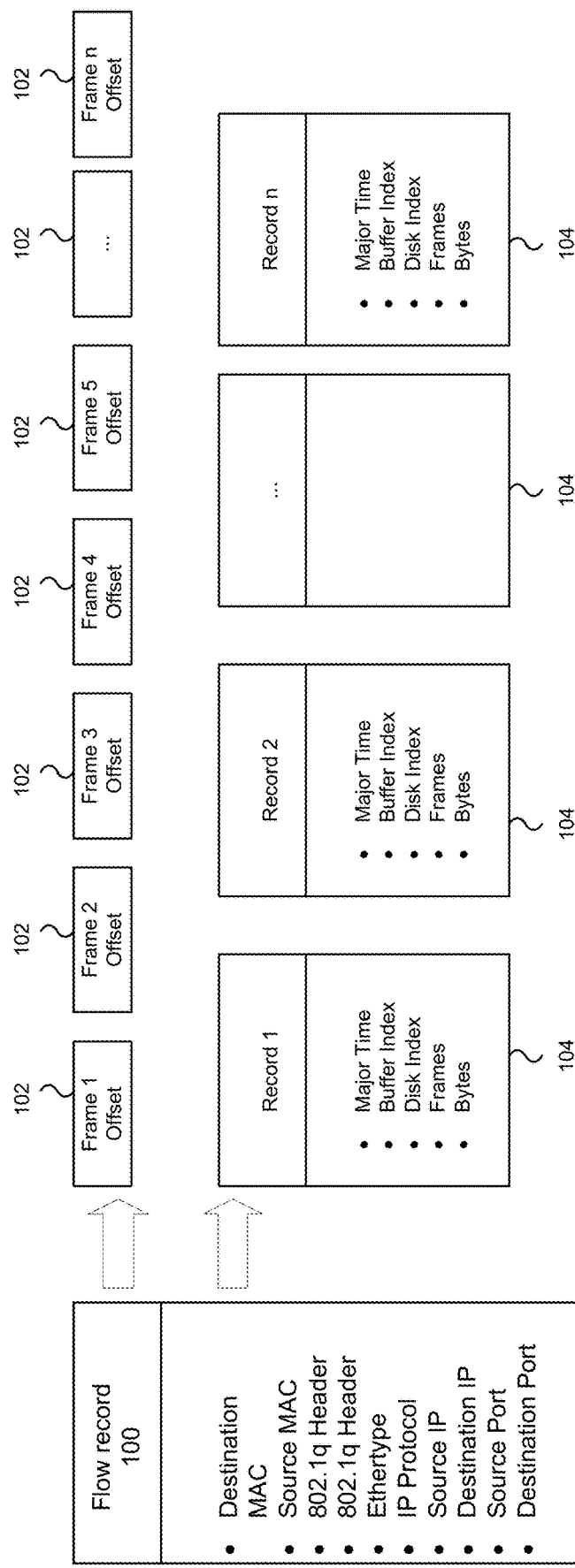
FIG. 2 shows a summary of information stored per data flow in some embodiments.

Reference is made to FIG. 2 which schematically shows the information stored per flow. The flow record 100 comprises the fields discussed in relation to Table 1. Also shown are the n Frame offsets 102 and the per flow statistics provided by records 104.

In some embodiments, in terms of storage, the size of the flow record may not be of importance as there is only one per flow.

Each frame offset may for example be 8 bytes. In different embodiments, a different frame offset size may be used. In some embodiments, there may be one such offset per frame captured.

The size of the temporal buffer may be bounded only by retention time.

A flow template hash table may be stored in RAM for indexing performance. Flow records may be stored in the RDB to facilitate querying. Each flow buffer containing 64-bit or the like offsets may be implemented as a flat file with new offsets being added using buffered writes to the end of the file. Each flow temporal buffer may be implemented as a file with a new record added once a second to the end of the file.

In some embodiments, as both flow offsets and temporal records are written directly to a file, both writes can be buffered and combined for efficiency and performance if required.

In some embodiments, metadata aging may be dealt with. One example of a suitable scheme may be as follows. Ageing may done on a per second basis or other time frame. Once a second (or other suitable time frame), each flow's first record disk index is compared to the current write pointer. If the data pointed to has been overwritten, the flow index entries within that second are removed from the flow buffer using the buffer index offsets in the temporal record and the temporal record is removed too. The fallocate( ) call may allow this and may de-allocate space freeing up file system blocks anywhere in the file.

The temporal buffer entries may provide all the statistics required to build top N flow tables for display via the frames and bytes fields. As per-second data is maintained, the generation of flow charts may be supported.

The querying performed by the query functions may take any suitable form. In some embodiments, the querying may comprise one or more of the following:

evaluate the query expression to obtain the minimum list of flows that are required to satisfy the expression;

use the temporal indexes into the flow tables to only extract the subset of the offsets in each required flow file;

combine the offsets into a single list, which is then used to obtain the records on disk; and as each frame is obtained, prune out any that fail to match the query.

The resulting record set should satisfy the query. This is only one example of a query process. The result of a query may not necessarily be packets. More complex queries may alternatively or additionally be provided.

In some embodiments, rather than reading records individually, the absolute offsets may be converted into a list of stripes containing at least one necessary record, read in complete stripes and filter out records not matching the query expression.

Figure 3:
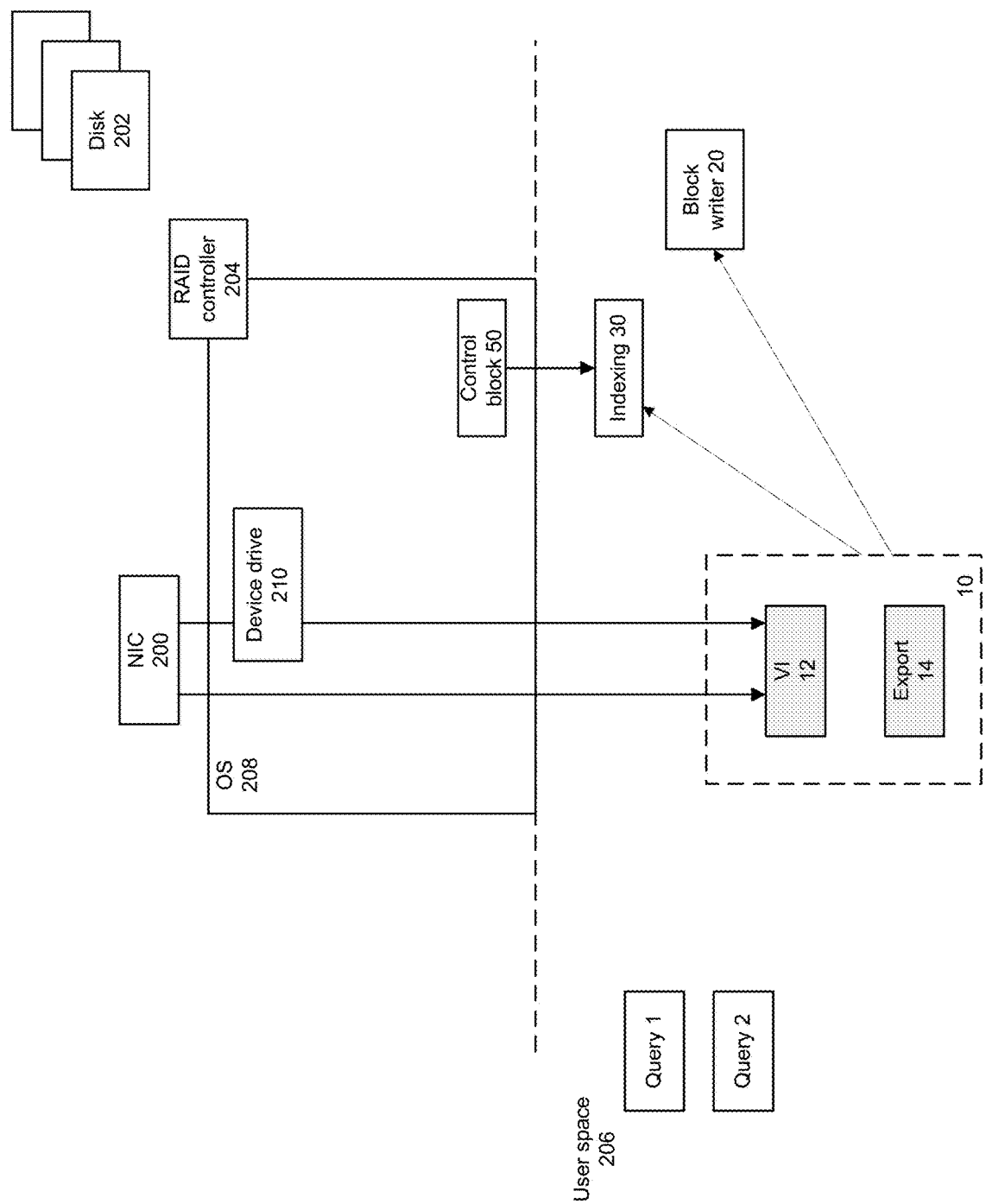
FIG. 3 shows a network architecture in which embodiments may be provided.

Reference is made to FIG. 3 which shows an architecture in which some embodiments may be provided. The system comprises a redundant array of independent disks RAID 202 which provide the block store 40. The RAID 202 are controlled by a RAID controller 204. The RAID controller 204 may be at least partially provided in the OS (operating system) 208. One or more network interface devices (erg NICs) 200 may be provided which provides an interface between a network (not shown) and the OS 208. The NIC may be supported by a device driver 210 in the OS.

The data which is received by the NIC may be passed to the capture block 10 which in some embodiments is located in the user space. The data thus goes from the NIC to host memory and from there to the block writer and indexing block. The indexing block 30 and block writer are also provided in the user space. In some embodiments, the control block 50 is provided in the operating system.

In some embodiments the query blocks may be provided in the user space.

In some embodiments, a data flow may be provided by one or more packets. In some embodiments, a data flow may be provided by one or more frames. In some embodiments, a frame may comprise one or more packets. It should be appreciated in other embodiments, any other suitable unit or block of data may comprise a data flow.

Embodiments may be provided by hardware blocks comprising one or more processors configured to run computer executable instructions in conjunction with at least one memory. One or more of the functional blocks shown in FIG. 1 may be regarded as a software module. One or more of the functional blocks may alternatively or additionally be provided by suitable hardware blocks.

At least part of some embodiments may be considered to be a virtual appliance which is provided by suitable hardware.

In some embodiments, at least part of some embodiments may be provided by one or more servers.

An appropriately adapted computer program code product or products may be used for implementing the embodiments, when loaded on an appropriate data processing apparatus. The program code product for providing the operation may be stored on, provided and embodied by means of an appropriate carrier medium. An appropriate computer program can be embodied on a computer readable record medium. A possibility is to download the program code product via a data network.

In some embodiments, computer executable instructions may be downloaded to cause hardware to provide the system of embodiments.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A system comprising:
a network interface having an input port configured to receive a stream of data packets;
a flow indexing function configured to identify, substantially in real time, a flow to which each of at least some of said data packets belongs by matching them to a flow template for the flow, and to update a corresponding flow index in response to the received packets with flow-specific summary information about the flow and location information about data packets in the flow;
a writer configured to, following the updating of the flow indices, write at least some of said received data packets to a data store and to write updated flow indices to the data store;
at least one query function configured to receive at least part of the stream of said data substantially in real time;
a controller configured to read data from said data store, wherein said controller is configured to control the rate at which data is read from said data store with respect to writing of data by said writer to said data store,
wherein the controller is configured to:
in response to determining that said stream of data is unavailable to said at least one query function in real time to subsequently control the reading of said data which was unavailable in real time from said data store such that said data which was unavailable in real time is provided to said at least one query function; and
in response to determining that the indexing function is unable to update the flow indices for received data in real time, subsequently obtain from the data store and provide to the indexing function data packets which have not been used to update flow indices.

2. The system as claimed in claim 1, wherein said controller is configured to obtain said data which was unavailable in real time from said data store and write said data which was unavailable in real time to shared memory, said at least one query function being configured to access said data which was unavailable in real time from said shared memory.

3. The system as claimed in claim 1, wherein said flow indices are queryable by at least one of said query functions.

4. A system as claimed in claim 1, wherein said controller is configured to prioritize writing by said writer to said data store over reading from said data store.

5. A system as claimed in claim 1, comprising at least one buffer configured to receive data from said input before said data is written to said data store.

6. A system as claimed in claim 5, wherein said controller is configured to change a rate at which data is read from said data store in response to a state of said at least one buffer.

7. A system as claimed in claim 1, wherein said writer is configured to capture a plurality of data flows and to provide a serialized output.

8. A system as claimed in claim 7, wherein the writer is configured to sequentially write said serialized output to said data store.

9. A system as claimed in claim 1, wherein at least one query function is provided in a virtual machine.

10. A system as claimed in claim 1, wherein said controller is configured to control scheduling of a plurality of queries from said at least one query function.

11. A system as claimed in claim 1, wherein a control channel is provided for at least one query function, said control channel being provided between said query function and said controller, wherein requests for data are provided from said query function to said control block via the control channel.

12. A system as claimed in claim 1 wherein only said controller is configured to read data from said data store.

13. A system as claimed in claim 1, further comprising a data store.

14. A computer implemented method comprising:
receiving a stream of data packets;
identifying, substantially in real time, a flow to which each of at least some of said data packets belongs by matching them to a flow template for the flow, and updating a corresponding flow index in response to the received packets with flow-specific summary information about the flow and location information about data packets in the flow;
following the updating of the flow indices, writing at least some of said received data packets to a data store and writing updated flow indices to the data store;
reading data from said data store;
at least one query function receiving at least part of the stream of said data packets substantially in real time;
controlling the rate at which data is read from data store with respect to writing of data to said data store; and
in response to determining that said stream of data is unavailable in real time, subsequently controlling the reading of said data which was unavailable in real time from said data store such that said data which was unavailable in real time is provided to said at least one query function; and
in response to determining that the data packets corresponding to a particular flow cannot be indexed in real time, subsequently obtaining from the data store that data which was not indexed and updating the corresponding flow index in response to the obtained data packets.

15. A non-transitory computer readable storage device having a computer readable program code stored therein, said computer readable program code containing instructions configured to be executed by one or more processors of a system to cause a method to be implemented, said method being for use with a stream of received data packets, said method comprising:
identifying, substantially in real time, a flow to which each of at least some of said data packets belongs by matching them to a flow template for the flow, and updating a corresponding flow index in response to the received packets with flow-specific summary information about the flow and location information about data packets in the flow;
following the updating of the flow indices, writing received data packets to a data store and writing updated flow indices to the data store;
reading data from said data store;
at least one query function receiving at least part of the stream of said data packets substantially in real time;
controlling the rate at which data is read from data store with respect to writing of data to said data store; and
in response to determining that said stream of data is unavailable in real time, subsequently controlling the reading of said data which was unavailable in real time from said data store such that said data which was unavailable in real time is provided to said at least one query function; and in response to determining that the data packets corresponding to a particular flow cannot be indexed in real time, subsequently obtaining from the data store that data which was not indexed and updating the corresponding flow index in response to the obtained data packets.

* * * * *